US012695857B2

(12) United States Patent
Yoo et al.

(10) Patent No.: US 12,695,857 B2
(45) Date of Patent: Jul. 28, 2026

(54) STEREOSCOPIC 360-DEGREE IMAGE/VIDEO GENERATION AND 3D DISPLAY SYSTEM

(71) Applicant: Korea Advanced Institute of Science and Technology, Daejeon (KR)

(72) Inventors: Hoi Jun Yoo, Daejeon (KR); Dong Seok Im, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 19/012,778

(22) Filed: Jan. 7, 2025

(65) Prior Publication Data

US 2026/0122210 A1    Apr. 30, 2026

(30) Foreign Application Priority Data

Oct. 24, 2024    (KR) ........................ 10-2024-0146453

(51) Int. Cl.
| | |
|---|---|
| *H04N 13/15* | (2018.01) |
| *H04N 13/128* | (2018.01) |
| *H04N 13/156* | (2018.01) |
| *H04N 13/363* | (2018.01) |
| *H04N 13/00* | (2018.01) |

(52) U.S. Cl.
CPC ......... *H04N 13/156* (2018.05); *H04N 13/128* (2018.05); *H04N 13/363* (2018.05); *H04N 2013/0081* (2013.01)

(58) Field of Classification Search
USPC ........................................................ 348/47
See application file for complete search history.

(56) References Cited

U.S. PATENT DOCUMENTS

| | | | | |
|---|---|---|---|---|
| 10,663,724 B1 * | 5/2020 | Laduke | ................. | G03B 35/20 |
| 2015/0358612 A1 | 12/2015 | Sandrew et al. | | |
| 2021/0297647 A1 * | 9/2021 | Nims | ................... | H04N 13/243 |
| 2021/0392314 A1 * | 12/2021 | Nims | ................... | G06F 1/1686 |
| 2022/0124296 A1 * | 4/2022 | Nims | ........................ | G06T 7/55 |
| 2024/0137481 A1 * | 4/2024 | Xie | ...................... | H04N 13/207 |
| 2025/0247511 A1 * | 7/2025 | Xue | ..................... | H04N 13/183 |

FOREIGN PATENT DOCUMENTS

KR    10-2022-0128406 A    9/2022

OTHER PUBLICATIONS

Gaurav Chaurasia, et. al., "Passthrough+: Real-time Stereoscopic View Synthesis for Mobile Mixed Reality", Proc. ACM Comput. Graph. Interact. Tech., vol. 3, No. 1, Article 7, May 2020.

* cited by examiner

*Primary Examiner* — Nigar Chowdhury
(74) *Attorney, Agent, or Firm* — Revolution IP, PLLC

(57) ABSTRACT

A stereoscopic 360-degree image/video generation and 3D display system includes a generation platform configured to generate a stereoscopic 360-degree image/video by inferring a disparity map from a 360-degree image/video, and a display platform configured to perform three-dimensional (3D) display on a 3D display device by scanning the stereoscopic 360-degree image/video generated by the generation platform. The stereoscopic 360-degree image/video generation 3D display system is divided into a stereoscopic 360-degree image/video generation platform that requires high throughput and a platform that three-dimensionally displays a low-latency stereoscopic 360-degree image/video, and thus has an effect of being able to efficiently achieve a platform configuration and hardware design for satisfying requirements in each platform.

8 Claims, 4 Drawing Sheets

1

STEREOSCOPIC 360-DEGREE IMAGE/VIDEO GENERATION AND 3D DISPLAY SYSTEM

CROSS-REFERENCE TO RELATED APPLICATION

This application claims the benefit of priority under 35 U.S.C. § 119(a) to Korean Patent Application No. 10-2024-0146453, filed on Oct. 24, 2024, the entire contents of which are incorporated herein by reference.

BACKGROUND OF THE INVENTION

Field of the Invention

The present invention relates to a stereoscopic 360-degree image/video generation and 3D display system, and more particularly to a stereoscopic 360-degree image/video generation and 3D display system for generating a 360-degree image/video and efficiently scanning this 360-degree image/video onto a three-dimensional (3D) display.

Description of the Related Art

Stereoscopy technology is technology capable of achieving a cubic effect by independently scanning an image/video taking into account binocular parallax on a screen. This technology may be applied to applications that utilize 3D displays such as AR/VR devices or 3D TVs.

A conventional method of implementing stereoscopic technology is to place two cameras at positions corresponding to two eyes of a person and project each camera video onto a 3D display (GAURAV CHAURASIA, et. al., "Passthrough+: Real-time Stereoscopic View Synthesis for Mobile Mixed Reality", Proc. ACM Comput. Graph. Interact. Tech., Vol. 3, No. 1, Article 7, May 2020). A 3D image/video may be viewed by capturing an image differently projected due to a difference in viewing angle between the two eyes of the person using each of cameras positioned at the two eyes of the person and scanning the image onto a screen.

However, in the case of a 360-degree image/video, a stereoscopic effect cannot be achieved even when two 360-degree cameras are placed at the two eyes. A reason therefor is that, since a camera coordinate system of a 360-degree camera is a spherical coordinate system, when one coordinate in space is projected onto each of spherical coordinate systems having different center points, projection points on the respective spatial coordinate systems are located completely differently from positions of the eyes of the person.

Therefore, it is impossible to implement stereoscopic technology for 360-degree images/videos using the conventional method.

Due to these limitations, current application technology (for example, You Tube VR, https://www.youtube.com/360) cannot project images corresponding to the two eyes of the person on a 3D display when playing 360-degree images/videos, and can only scan the same images, which makes it difficult for the user to feel a 3D effect in the 360-degree images/videos.

SUMMARY OF THE INVENTION

To solve the above-mentioned problems, it is an object of the present invention to propose a system for inferring a disparity map from a 360-degree image/video and generating a stereoscopic 360-degree image/video using this disparity map and to provide a stereoscopic 360-degree image/video generation and 3D display system capable of providing a more immersive image/video by scanning a stereoscopic 360-degree image/video synthesized on a 3D display device.

In particular, to solve the above-mentioned problems, it is another object of the present invention to provide a stereoscopic 360-degree image/video generation and 3D display system capable of providing a method of inferring a disparity map of 360-degree images captured from a general camera or single 360-degree camera using artificial intelligence (AI) technology and synthesizing 360-degree images of the other eye using this disparity map.

In addition, to efficiently implement the above-described technology, it is a further object of the present invention to propose a system that separates a platform for generating stereoscopic 360-degree images/videos and a platform for three-dimensionally displaying stereoscopic 360-degree images/videos and to provide a stereoscopic 360-degree image/video generation and 3D display system enabling faster and more efficient viewing of images/videos.

In accordance with the present invention, the above and other objects can be accomplished by the provision of a stereoscopic 360-degree image/video generation and 3D display system including a generation platform configured to generate a stereoscopic 360-degree image/video by inferring a disparity map from a 360-degree image/video, and a display platform configured to perform three-dimensional (3D) display on a 3D display device by scanning the stereoscopic 360-degree image/video generated by the generation platform.

In the stereoscopic 360-degree image/video generation and 3D display system, the generation platform may include an image capturing module configured to generate a 360-degree image by utilizing multiple cameras or a time-based image overlay technique, a disparity map generation module configured to project images corresponding to tangent surfaces of spherical coordinate systems onto the 360-degree image, then infer a disparity map of each image using artificial intelligence (AI) technology, and inverse-project this disparity map onto the spherical coordinate system to generate a 360-degree image disparity map, and an opposite eye viewpoint image generation module configured to generate a 360-degree image corresponding to another field of view by utilizing the 360-degree image and the 360-degree image disparity map.

In the stereoscopic 360-degree image/video generation and 3D display system, the disparity map generation module may generate a 360-degree image disparity map by directly applying AI technology to the 360-degree image.

In the stereoscopic 360-degree image/video generation and 3D display system, the opposite eye viewpoint image generation module may utilize the 360-degree image and the 360-degree image disparity map to warp an original image pixel to an image coordinate system corresponding to an opposite eye according to a disparity value in the 360-degree image corresponding an to original in an equirectangular image coordinate system, thereby generating a 360-degree image corresponding to a viewpoint of the opposite eye.

In the stereoscopic 360-degree image/video generation and 3D display system, the opposite eye viewpoint image generation module may project the 360-degree image and a 360-degree disparity map in several viewpoint directions sufficient to encompass all spherical coordinate system information corresponding to tangent surfaces of spherical coordinate systems, then perform warping to an image coordinate system corresponding to an opposite eye using each image and a disparity map corresponding thereto, and inverse-project again and then combine results thereof, thereby generating a 360-degree image of the opposite eye.

In stereoscopic 360-degree image/video generation and 3D display system, the opposite eye viewpoint image generation module may fill a missing part of an untilled image with image pixels using inpainting technology in the generated 360-degree image of the opposite eye.

In the stereoscopic 360-degree image/video generation and 3D display system, the display platform may include an image loading module configured to load a 360-degree image generated by each of the image capturing module and the opposite eye viewpoint image generation module, a tangent surface image projection module configured to project 360-degree images of two eyes loaded by the image loading module onto tangent surfaces through image projection in accordance with target viewing angles, thereby generating tangent surface images at positions in a field of view of a person, and a display module configured to scan two tangent surface images at the positions in the field of view of the person received from the tangent surface image projection module on a screen corresponding to the positions of the two eyes of the person.

In the stereoscopic 360-degree image/video generation and 3D display system, when the 360-degree images of the two eyes are projected onto the tangent surface images of the two eyes, the tangent surface image projection module may perform calculation through [Mathematical Formula 1] or [Mathematical Formula 2] below, and project an image projection result of a viewpoint of one eye based on [Mathematical Formula 1] or [Mathematical Formula 2] below onto an image of a viewpoint of the other eye to generate tangent surface images of the two eyes from the 360-degree images of the two eyes:

[Mathematical Formula 1]

$$u = \frac{\cos(\Phi)\sin(\theta - \theta_c)}{\cos(c)},$$

$$v = \frac{\cos(\Phi_c)\sin(\Phi) - \sin(\Phi_c)\cos(\Phi)\cos(\Phi - \Phi_c)}{\cos(c)},$$

$$\cos(c) = \sin(\Phi_c)\sin(\Phi) + \cos(\Phi_c)\cos(\Phi)\cos(\theta - \theta_c), \text{ and}$$

[Mathematical Formula 2]

$$\theta - \theta_c + tna^{-1}\left(\frac{u \cdot \sin(c)}{r\cos(\Phi_c)\cos(c) - v \cdot \sin(\Phi_c)\sin(c)}\right),$$

$$\Phi = \sin^{-1}\left(\cos(c)\sin(\Phi_c) + \frac{1}{r}v \cdot \sin(c)\cos(\Phi_c)\right)$$

$$r = \sqrt{u^2 + v^2} \text{ and } c = \tan^{-1}r$$

where $\theta$ denotes a longitude in a spherical coordinate system, $\varphi$ denotes a latitude in the spherical coordinate system, $\theta_c$ denotes a longitude in a spherical coordinate system corresponding to a center of a tangent surface image, $\varphi_c$ denotes a latitude in the spherical coordinate system corresponding to the center of the tangent surface image, u denotes a horizontal coordinate in the tangent surface image, and v denotes a vertical coordinate in the tangent surface image.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
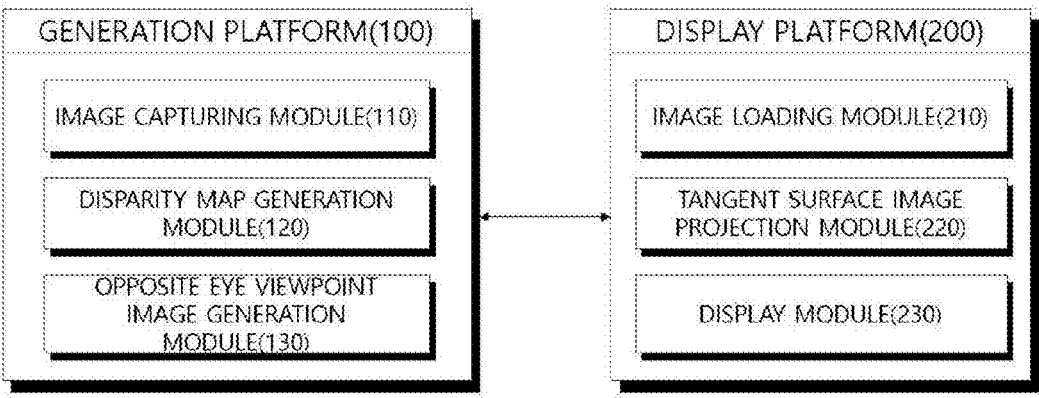
FIG. 1 is a configuration diagram of a stereoscopic 360-degree image/video generation and 3D display system according to the present invention.

The terms or words used in this specification and claims should not be interpreted as limited to usual or dictionary meanings, and should be interpreted as having meanings and concepts consistent with the technical idea of invention based on the principle that the the present inventor may appropriately define concepts of terms to best describe the invention of the inventor.

Therefore, the embodiments described in this specification and the configurations illustrated in the drawings are only the most preferred embodiments of the present invention and do not represent all of the technical ideas of the present invention. Therefore, it should be understood that there may be various equivalents and modified examples that may replace the embodiments at the time of filing this application.

Hereinafter, a detailed description will be given of a 3D display system using generation of a stereoscopic 360-degree image/video according to the present invention with reference to the accompanying drawings.

FIG. 1 is a configuration diagram of the 3D display system using generation of the stereoscopic 360-degree image/video according to the present invention.

As illustrated in FIG. 1, the 3D display system using generation of the stereoscopic 360-degree image/video according to the present invention includes a generation platform 100 and a display platform 200.

The generation platform 100 that infers a disparity map of 360-degree images captured from a general camera or a single 360-degree camera using AI technology and synthesizes 360-degree images of other eyes using this disparity map includes an image capturing module 110, a disparity map generation module 120, and an opposite eye viewpoint image generation module 130.

Figure 2:
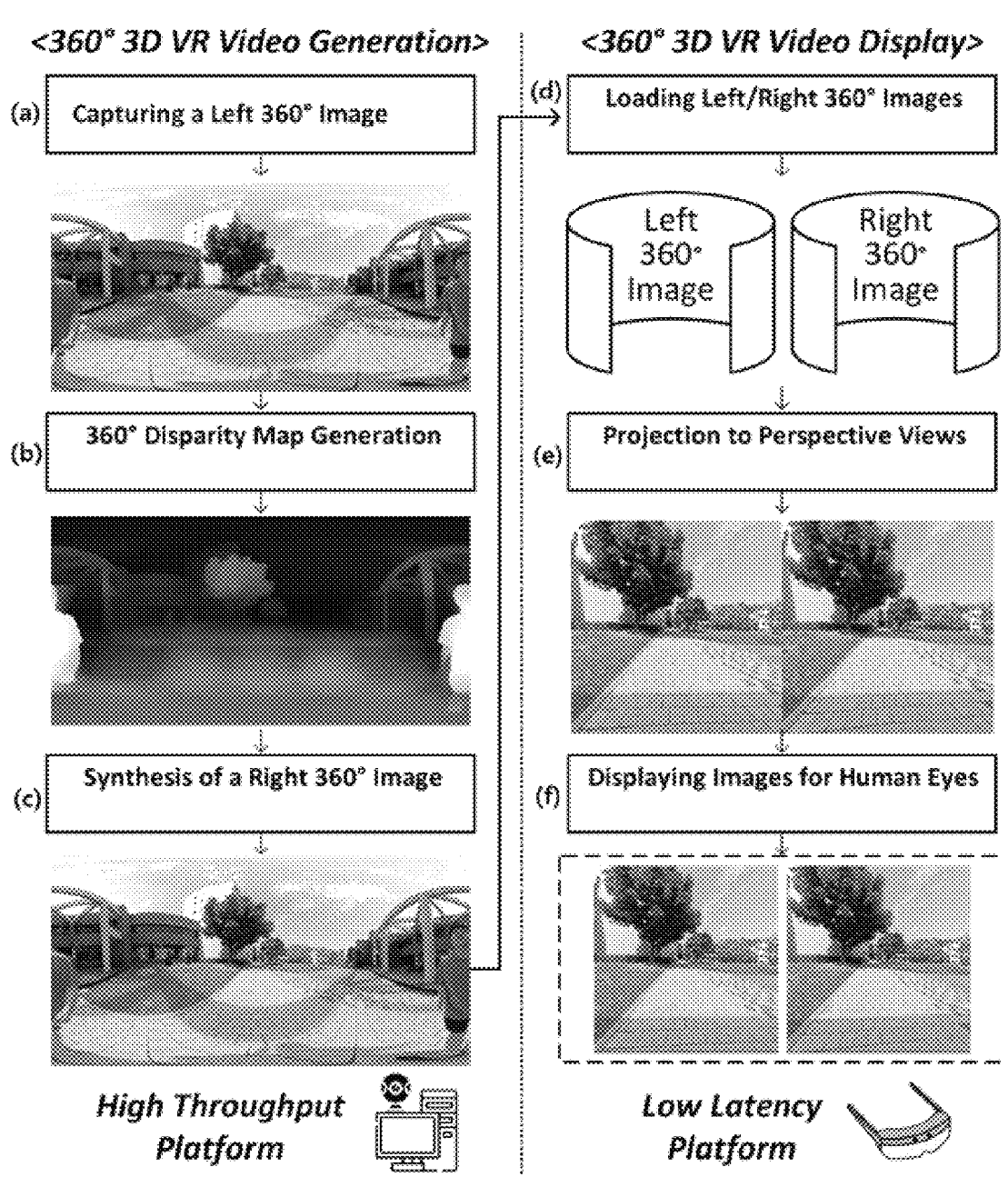
FIG. 2 is a diagram for describing an image generation process of a generation platform and a display process of a display platform in the stereoscopic 360-degree image/video generation and 3D display system according to the present invention.

The image capturing module 110 utilizes multiple cameras or a time-based image overlay technique to generate a 360-degree image as illustrated in FIG. 2A.

The disparity map generation module 120 projects images corresponding to tangent surfaces of spherical coordinate systems onto the 360-degree images generated by the image capturing module 110 from several viewpoints sufficient to encompass all spherical coordinate system information, then infers a disparity map of each image using AI technology, and inverse-projects this disparity map onto the spherical coordinate system to generate a 360-degree image disparity map as illustrated in FIG. 2B.

The disparity map generation module 120 may generate a 360-degree image disparity map by directly applying AI technology to the 360-degree image generated by the image capturing module 110.

The opposite eye viewpoint image generation module 130 utilizes the 360-degree image generated by the image capturing module 110 and the 360-degree image disparity map generated by the disparity map generation module 120 to directly warp an original image pixel to an image coordinate system corresponding to the other one of two eyes (opposite eye) according to a disparity value in the 360-image corresponding to an original in an equirectangular image coordinate system, thereby generating a 360-degree image corresponding to the other field of view.

The opposite eye viewpoint image generation module 130 projects a 360-degree image and a 360-degree disparity map in several viewpoint directions sufficient to encompass all spherical coordinate system information corresponding to tangent surfaces of spherical coordinate systems, then performs warping to an image coordinate system corresponding to the other one of the two eyes (opposite eye) using each image and a disparity map corresponding thereto, and inverse-projects again and then combines results thereof, thereby generating a 360-degree image of the other one of the two eyes (opposite eye) as illustrated in FIG. 2C.

In this instance, the opposite eye viewpoint image generation module 130 fills results using inpainting technology, which is an image correction method of naturally filling a missing part of an image based on surrounding context, by utilizing a deep learning-based generation model in an unfilled area of the generated 360-degree image, so that all image pixels are filled.

The opposite eye viewpoint image generation module 130 is not limited to the deep learning-based generation model, and it is possible to utilize a traditional computer vision algorithm (for example, A. Telea, An Image Inpainting Technique Based on the Fast Marching Method).

Meanwhile, the display platform 200 includes an image loading module 210, a tangent surface image projection module 220, and a display module 230.

As illustrated in FIG. 2D, the image loading module 210 loads a 360-degree image generated by each of the image capturing module 110 and the opposite eye viewpoint image generation module 130 of the generation platform 100.

Figure 3:
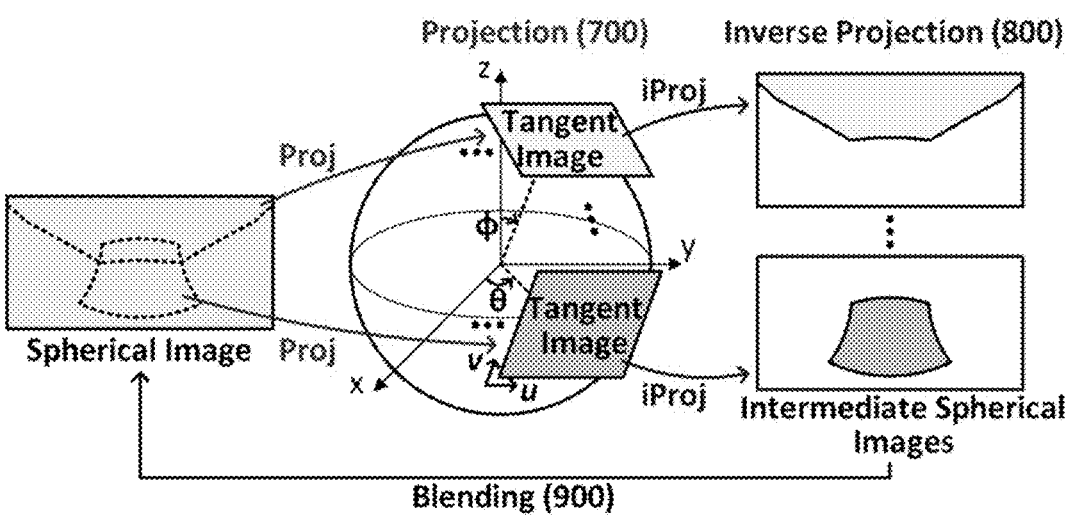
FIG. 3 is a diagram schematically illustrating tangential projection and inverse projection of the stereoscopic 360-degree image/video generation and 3D display system according to the present invention.

The tangent surface image projection module 220 projects 360-degree images of two eyes loaded by the image loading module 210 onto tangent surfaces through image projection in accordance with target viewing angles as illustrated in FIG. 3, thereby generating tangent surface images at positions in a field of view of a person as illustrated in FIG. 2E.

In this instance, the tangent surface image projection module 220 preferably assumes (sets) the target viewing angles of the two eyes to be the same or similar values.

The display module 230 scans (displays) two tangent surface images at the positions in the field of view of the person received from the tangent surface image projection module 220 on a screen corresponding to the positions of the two eyes of the person as illustrated in FIG. 2F.

The tangent surface image projection module 220 calculates image projections 700 for the corresponding 360-degree images of the two eyes in the spherical coordinate systems as illustrated in FIG. 3 using the following [Mathematical Formula 1].

[Mathematical Formula 1]

$$u = \frac{\cos(\Phi)\sin(\theta - \theta_c)}{\cos(c)},$$

$$v = \frac{\cos(\Phi_c)\sin(\Phi) - \sin(\Phi_c)\cos(\Phi)\cos(\Phi - \Phi_c)}{\cos(c)},$$

$$\cos(c) = \sin(\Phi_c)\sin(\Phi) + \cos(\Phi_c)\cos(\Phi)\cos(\theta - \theta_c)$$

In [Mathematical Formula 1], $\theta$ denotes a longitude in the spherical coordinate system, $\varphi$ denotes a latitude in the spherical coordinate system, $\varphi_c$ denotes a longitude in the spherical coordinate system corresponding to a center of a tangent surface image, $\varphi_c$ denotes a latitude in the spherical coordinate system corresponding to the center of the tangent surface image, u denotes a horizontal coordinate in the tangent surface image, and v denotes a vertical coordinate in the tangent surface image.

As illustrated in FIG. 3, the display platform 200 calculates inverse projections 800 onto the spherical coordinate systems for the tangent surface images using [Mathematical Formula 2] below, and combines results of inverse projection of several tangent surface images into one 360-degree image through image blending 900.

[Mathematical Formula 2]

$$\theta - \theta_c + tna^{-1}\left(\frac{u \cdot \sin(c)}{r\cos(\Phi_c)\cos(c) - v \cdot \sin(\Phi_c)\sin(c)}\right),$$

$$\Phi = \sin^{-1}\left(\cos(c)\sin(\Phi_c) + \frac{1}{r}v \cdot \sin(c)\cos(\Phi_c)\right)$$

$$r = \sqrt{u^2 + v^2} \text{ and } c = \tan^{-1}r$$

Figure 4:
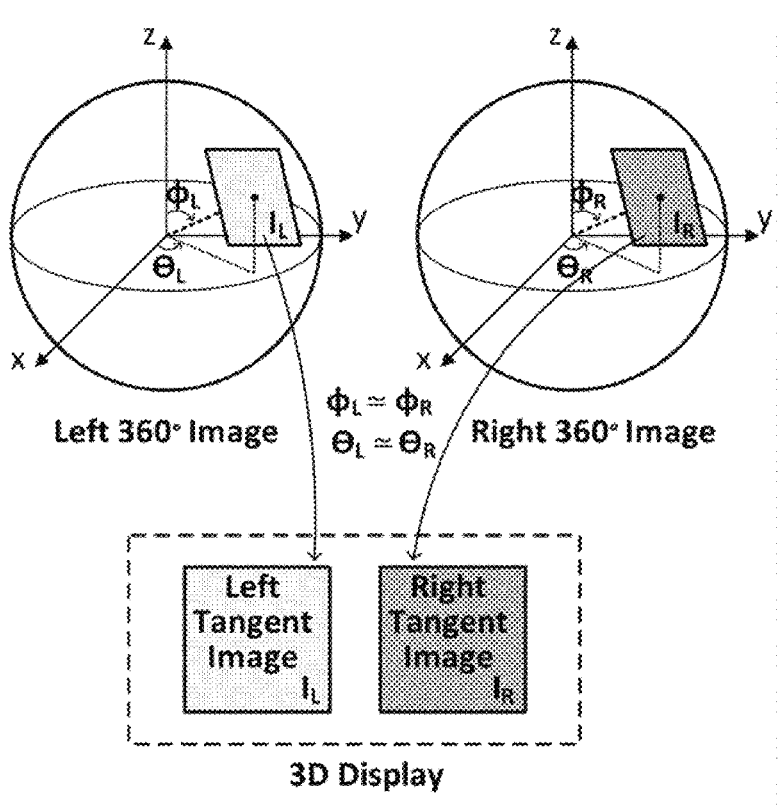
FIG. 4 is a diagram schematically illustrating a method of projecting 360-degree images of two eyes onto tangential images at positions in a field of view of a person using the stereoscopic 360-degree image/video generation and 3D display system according to the present invention.

As illustrated in FIG. 4, when the 360-degree images of the two eyes are projected onto the tangent surface images, a left 360-degree image and a right 360-degree image are projected at the same longitude $\theta$ and latitude $\varphi$ in the spherical coordinate systems.

In this way, [Mathematical Formula 1] or [Mathematical Formula 2] is calculated only once and a result is identically applied to the two eyes to obtain the tangent surface images of the two eyes, and thus scanning may be performed on a 3D display with a lower latency speed.

For reference, depending on the projection method, [Mathematical Formula 1] (Forwarding Warping) and [Mathematical Formula 2] (Backward Warping) may be used.

A key point of the present invention is that, during forward warping, instead of using the complicated conventional [Mathematical Formula 1] twice, [Mathematical Formula 1] is calculated only once and used for binocular projection, and similarly, during backward warping, instead of using the conventional [Mathematical Formula 2] twice, [Mathematical Formula 2] is calculated only once and used for binocular projection.

The 3D display system using generation the stereoscopic 360-degree image/video according to the present invention is divided into a stereoscopic 360-degree image/video generation platform that requires high throughput and a platform that three-dimensionally displays a low-latency stereoscopic 360-degree image/video, and thus has an effect of being able to efficiently achieve a platform configuration and hardware design for satisfying requirements in each platform.

In addition, the 3D display system using generation of the stereoscopic 360-degree image/video according to the present invention generates 360-degree images/videos corresponding to the two eyes, thereby having an effect of enabling generation and display of the stereoscopic 360-degree image/video, which could not be implemented using a conventional technology for positioning two cameras at both eyes.

In addition, the 3D display system using generation of the stereoscopic 360-degree image/video according to the present invention infers a 360-degree disparity map using AI technology without relying on a 3D scanner or sensor to overcome the limitation of the existing 3D scanner and sensor not being able to capture a full 360-degree disparity map, and has an effect of being able to obtain a 360-degree disparity map with much lower power.

In addition, the 3D display system using generation of the stereoscopic 360-degree image/video according to the present invention has an effect of enabling scanning in a 3D display with a lower latency speed since, when 360-degree images/videos corresponding to the two eyes are generated, the platform that three-dimensionally displays the stereoscopic 360-degree image/video projects tangent surface images corresponding to the same viewpoints in spherical coordinate systems of the two 360-degree images corresponding to the two eyes, and projects images of the two eyes using a tangent surface coordinate transformation operation of a viewpoint of one eye.

Even though the technical idea of the present invention has been described above with the attached drawings, this is merely an example of a preferred embodiment of the present invention and does not limit the present invention. In addition, it is a clear fact that anyone having ordinary knowledge in the technical field to which the present invention pertains may make various modifications and imitations within the scope of the technical idea of the present invention.

What is claimed is:

1. A stereoscopic 360-degree image/video generation and 3D display system comprising:

a generation platform configured to generate a stereoscopic 360-degree image/video by inferring a disparity map from a 360-degree image/video; and a display platform configured to perform three-dimensional (3D) display on a 3D display device by scanning the stereoscopic 360-degree image/video generated by the generation platform, wherein the generation platform comprises:

an image capturing module configured to generate a 360-degree image by utilizing multiple cameras or a time-based image overlay technique;

a disparity map generation module configured to project images corresponding to tangent surfaces of spherical coordinate systems onto the 360-degree image, then infer a disparity map of each image using artificial intelligence (AI) technology, and inverse-project this disparity map onto the spherical coordinate system to generate a 360-degree image disparity map; and an opposite eye viewpoint image generation module configured to generate a 360-degree image corresponding to another field of view by utilizing the 360-degree image and the 360-degree image disparity map.

2. The stereoscopic 360-degree image/video generation and 3D display system according to claim 1, wherein the disparity map generation module generates a 360-degree image disparity map by directly applying AI technology to the 360-degree image.

3. The stereoscopic 360-degree image/video generation and 3D display system according to claim 1, wherein the opposite eye viewpoint image generation module utilizes the 360-degree image and the 360-degree image disparity map to warp an original image pixel to an image coordinate system corresponding to an opposite eye according to a disparity value in the 360-degree image corresponding to an original in an equirectangular image coordinate system, thereby generating a 360-degree image corresponding to a viewpoint of the opposite eye.

4. The stereoscopic 360-degree image/video generation and 3D display system according to claim 1, wherein the opposite eye viewpoint image generation module projects the 360-degree image and a 360-degree disparity map in several viewpoint directions sufficient to encompass all spherical coordinate system information corresponding to tangent surfaces of spherical coordinate systems, then performs warping to an image coordinate system corresponding to an opposite eye using each image and a disparity map corresponding thereto, and inverse-projects again and then combines results thereof, thereby generating a 360-degree image of the opposite eye.

5. The stereoscopic 360-degree image/video generation and 3D display system according to claim 3, wherein the opposite eye viewpoint image generation module fills a missing part of an untilled image with image pixels using inpainting technology in the generated 360-degree image of the opposite eye.

6. The stereoscopic 360-degree image/video generation and 3D display system according to claim 4, wherein the opposite eye viewpoint image generation module fills a missing part of an untilled image with image pixels using inpainting technology in the generated 360-degree image of the opposite eye.

7. The stereoscopic 360-degree image/video generation and 3D display system according to claim 1, wherein the display platform comprises:

an image loading module configured to load a 360-degree image generated by each of the image capturing module and the opposite eye viewpoint image generation module;

a tangent surface image projection module configured to project 360-degree images of two eyes loaded by the image loading module onto tangent surfaces through image projection in accordance with target viewing angles, thereby generating tangent surface images at positions in a field of view of a person; and a display module configured to scan two tangent surface images at the positions in the field of view of the person received from the tangent surface image projection module on a screen corresponding to the positions of the two eyes of the person.

8. The stereoscopic 360-degree image/video generation and 3D display system according to claim 7, wherein, when the 360-degree images of the two eyes are projected onto the tangent surface images of the two eyes, the tangent surface image projection module performs calculation through [Mathematical Formula 1] or [Mathematical Formula 2] below, and projects an image projection result of a viewpoint of one eye based on [Mathematical Formula 1] or [Mathematical Formula 2] below onto an image of a viewpoint of the other eye to generate the tangent surface images of the two eyes from the 360-degree images of the two eyes:

[Mathematical Formula 1]

$$u = \frac{\cos(\Phi)\sin(\theta - \theta_c)}{\cos(c)},$$

$$v = \frac{\cos(\Phi_c)\sin(\Phi) - \sin(\Phi_c)\cos(\Phi)\cos(\Phi - \Phi_c)}{\cos(c)},$$

$$\cos(c) = \sin(\Phi_c)\sin(\Phi) + \cos(\Phi_c)\cos(\Phi)\cos(\theta - \theta_c), \text{ and}$$

[Mathematical Formula 2]

$$\theta - \theta_c + tna^{-1}\left(\frac{u \cdot \sin(c)}{r\cos(\Phi_c)\cos(c) - v \cdot \sin(\Phi_c)\sin(c)}\right),$$

$$\Phi = \sin^{-1}\left(\cos(c)\sin(\Phi_c) + \frac{1}{r}v \cdot \sin(c)\cos(\Phi_c)\right)$$

$$r = \sqrt{u^2 + v^2} \text{ and } c = \tan^{-1}r$$

where $\theta$ denotes a longitude in a spherical coordinate system, $\varphi$ denotes a latitude in the spherical coordinate system, $\theta_c$ denotes a longitude in a spherical coordinate system corresponding to a center of a tangent surface image, Qc denotes a latitude in the spherical coordinate system corresponding to the center of the tangent surface image, u denotes a horizontal coordinate in the tangent surface image, and v denotes a vertical coordinate in the tangent surface image.

\* \* \* \* \*